United States Patent [19]

Hudson et al.

[11] Patent Number: 4,485,668
[45] Date of Patent: Dec. 4, 1984

[54] LEAK DETECTOR FOR PRESSURIZED PIPES

[75] Inventors: James H. Hudson, Sunrise, Fla.; Arthur W. Otto, deceased, late of Lighthouse Pt., Fla., by Christine Otto, administratrix

[73] Assignee: Leak Detective, Inc., Sunrise, Fla.

[21] Appl. No.: 431,688

[22] Filed: Sep. 30, 1982

[51] Int. Cl.³ .............................................. G01M 3/24
[52] U.S. Cl. .............................................. 73/40.5 A
[58] Field of Search ................ 73/40.5 A; 138/97, 94; 134/167 C

[56] References Cited

U.S. PATENT DOCUMENTS

| | | | |
|---|---|---|---|
| 3,409,897 | 11/1968 | Bosselaar et al. | 73/40.5 A X |
| 3,413,653 | 11/1968 | Wood | 73/40.5 A X |
| 3,478,576 | 11/1969 | Bogle | 73/40.5 A |
| 3,508,433 | 4/1970 | Bustin | 73/40.5 A |
| 3,691,819 | 9/1972 | Guest | 73/40.5 A |
| 4,051,714 | 10/1977 | Fechter et al. | 73/40.5 A |
| 4,073,302 | 2/1978 | Jones | 134/167 C |
| 4,418,572 | 12/1983 | Prange | 73/432 G |

FOREIGN PATENT DOCUMENTS 1362929  8/1974  United Kingdom ............... 138/97

Primary Examiner—Gerald Goldberg
Assistant Examiner—Joseph W. Roskos
Attorney, Agent, or Firm—John W. Huckert

[57] ABSTRACT

A method and apparatus for detecting leaks in pressurized mains comprising input coupling structures spaced along a main, each coupling permitting insertion of a detector head connected to a hose/cable of extended length, a reel and housing holding the hose/cable which is designed to input fluid into the hose and make electrical connections to microphone and transducer structure in the head. Leaks in the main are located by depressurizing the main, inserting the detector head through a coupling, feeding pressurized fluid through the hose into rearwardly projecting jets in the head for effecting travel thereof lengthwise of the main, stopping the fluid flow, again pressurizing the main to effect any leaks, energizing the microphone while slowly retracting the head by winding up the hose/cable on the reel at the input position, listening for leak noise as the head is retracted toward the insertion point, and upon leak noise being heard, stopping the retraction and then energizing the transducer within the head. Signals from the transducer can be detected by an above-ground receiver for pinpointing each leak. After suitably marking each point of leakage, the retraction, listening, stopping, signalling, etc. steps are repeated for each additional leak.

20 Claims, 11 Drawing Figures

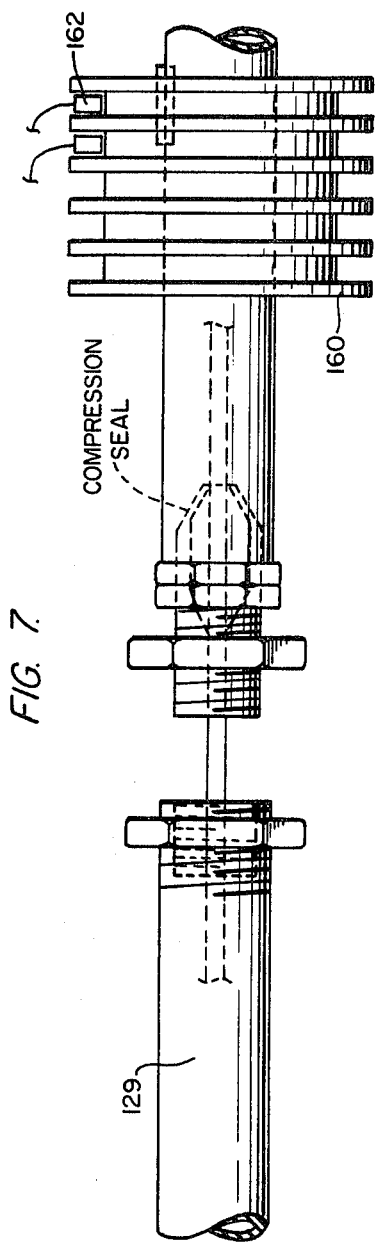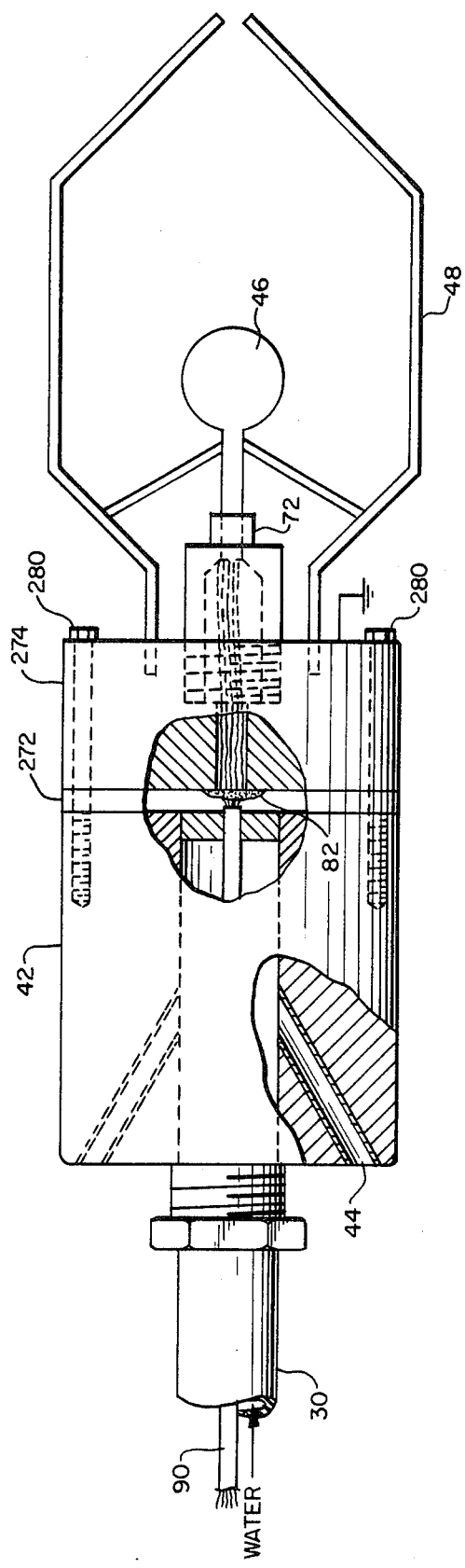

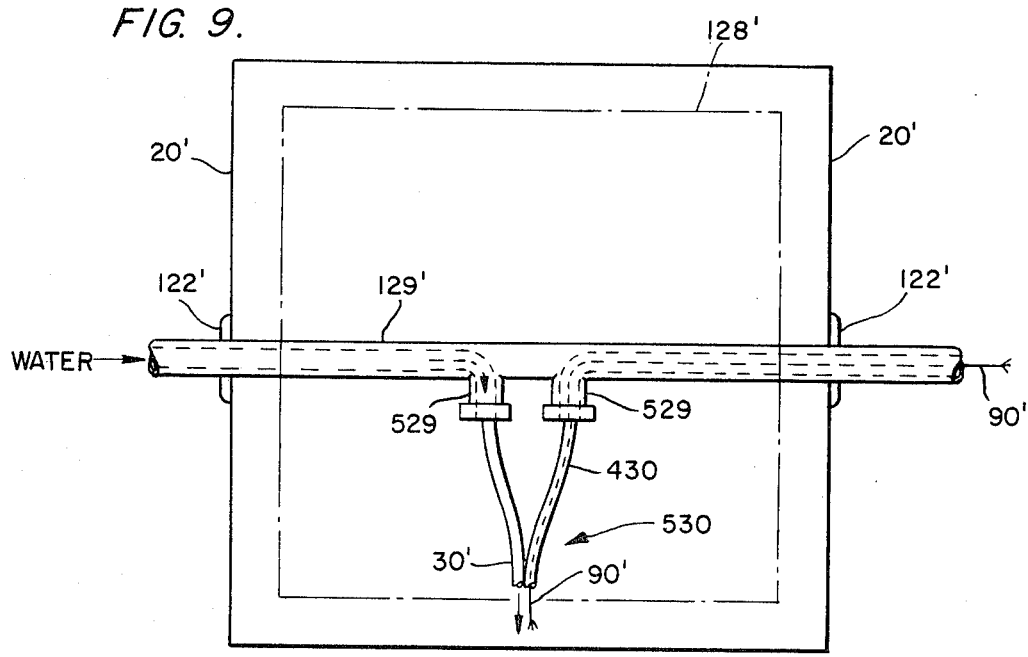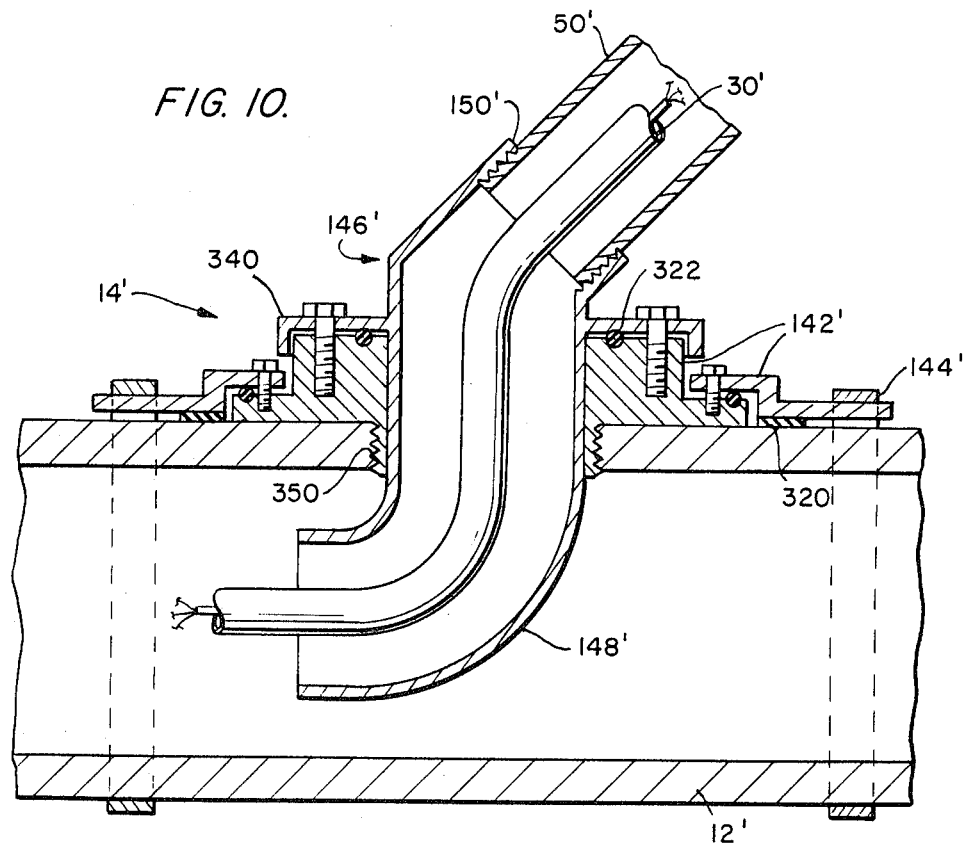

LEAK DETECTOR FOR PRESSURIZED PIPES

BACKGROUND OF THE INVENTION

1. Field of the Invention

This invention relates generally to devices for detecting leaks in pipes containing liquid under pressure.

2. Description of the Prior Art

A common problem with known leak detectors of conventional type is that they are unduly complicated and expensive, and generally are not as accurate in pinpointing the area of leaking as is desired.

There have been devices devised to travel along inside a pipe to detect leaks therein, but oftentimes these still are far from effective. Similarly, structures for detecting leaks externally of the pipe also leave much to be desired.

Existing prior patents which may be pertinent to this invention are as follows:

| Dean et al | 2,884,624 | April 28, 1959 |
|---|---|---|
| Parker | 3,289,465 | December 6, 1966 |
| Guest | 3,691,819 | September 19, 1972 |
| Boselaar | 3,638,156 | June 12, 1973 |

These patents generally show apparatus for detecting leaks in various types of pipes or lines. For example, the patent of Dean, et al shows a vehicle insertable into a pressurized pipe which can be pumped from one end of a pipe to the other and which simultaneously transmits by supersonic vibrations a signal which is indicative of noise encountered in its travel through the pipe. The Parker patent discloses an ultrasonic leak detector which is moved by an operator externally of the line or cable to locate leaks therein. The patent of Guest discloses a pig which is caused to move through a pipe through self-propelled structure having a transmitter external of the pipeline to transmit an interrogation wave signal to the pig for detecting leaks in the pipe. The Boselaar patent discloses a method of leak detection using an ultrasonic leak detector wherein a portion of the liquid flowing through the pipe is replaced with a special test liquid of different viscosity from that of the main liquid flow. The specific apparatus for effecting this method of detection is not disclosed in this patent.

However, none of the known prior art devices offers the new and novel features of the present invention.

SUMMARY OF THE INVENTION

An object of the present invention is to provide a leak detector for pressurized pipes, especially water mains, which can quite accurately detect any number of different leaks present.

Another object of the present invention is to provide an easily installed device for testing for leaks in water mains carrying water under substantial pressure having ease and accuracy of operation, at a fairly reasonable cost.

A further object of this invention is to provide a pressurized pipe leak detecting device which can be easily and quickly put into operation, and yet will quite accurately locate any number of leaks in a pressurized pipe transporting water therethrough.

A still further important object of the present invention is to provide a leak detector which is flexible in that it can be used with built-in taps or taps placed as needed, spaced along a water main so that the detector can, under hydraulic pressure, be moved a given distance in either direction along the main from each tap.

Another object of the present invention is to provide an operator-controlled leak detector for use with another assistant in pinpointing one or more leaks in pressurized city water mains and/or feeder offshoots.

The present invention has a number of new and novel features for detecting leaks in pressurized water mains. The problem addressed here is to detect a leak and locate its position with sufficient accuracy so that repair efforts are kept at a minimum. After extensive experimentation with detection methods the most practical approach seems to be utilizing the sound produced by water turbulence generated at the point of leaking. When the leak is detected, its positon is determined by an assistant walking the surface of the ground above the pipe and observing the numerical value of the distance display in a receiver station carried by the assistant. As the leak position is approached, the numerical value will diminish to a minimum value and begin increasing again as the leak position is passed. The theoretical limit of accuracy of this system is plus or minus (6) inches. Following is a brief description of the theory of operation.

Leak Detector: The leak detector is mounted on a small vehicle which is propelled down the unpressurized pipe by water jets. The water main pipe normally has provided a T-tap approximately every 2,000 feet. This T-tap generally and preferably is installed when the water main is installed, but can be installed as needed. The connecting hose and cable for the leak detector is approximately 1,000 feet in length. Thus, after the detector head has been inserted into the water main through an appropriate valve, the hose is energized with water pressure and the jets in the head force same along the pipe to the end of the hose/cable, i.e., approximately a 1,000 foot distance. Then the main water line is pressurized to approximately 100 pounds per square inch. The reel having the end of the hose/cable remote from the head attached thereto is then wound to bring the detector head back to the leak detection station. The detector head itself has a small, highly sensitive dynamic microphone therein. As a leak in the water main is approached, the sound generated by the leak becomes louder. The signal is amplified and displayed on a meter back at the reel station. The meter reading will peak and then diminish as the leak is passed. The vehicle should be positioned at the point of maximum reading. An audio amplifier and loudspeaker are included as a convenience feature so that the operator does not have to observe the meter until the time of final positioning.

Positioner: Also mounted in the leak detector head is an ultra-sonic transducer. Located at the sending hose reel station is a one kilo-hertz oscillator and controller. The controller sends out the 1 KHz signal either automatically or manually to the transducer. The transmitted signal is received by a radio receiver and is used to turn on a display counter which begins counting at a 10 KHz rate. The signal produced by the ultra-sonic transducer is detected at the earth's surface by a microphone held by a second operator/assistant. When the ultrasonic signal is detected, it is used to turn off the display counter.

What has actually been measured is travel time of sound from the detector head or vehicle in the pipe to the location of the surface microphone in terms of number of counts. As the second operator walks the surface above the pipe, the number of counts will decrease as he approaches the leak position. Directly above the leak, the count will be a minimum and, if the depth of the pipe were known, the instrument could be calibrated to read zero at the leak point and the count could be directly related to distance in feet. The theoretical limit of accuracy is based on the fact that sound travels at approximately 5,000 feet per second in water. The counter is running at 10 KHz, so, each count is equivalent to 6 (six) inches.

$$\frac{5{,}000 \text{ ft/sec}}{10{,}000 \text{ counts/sec}} = 0.5 \text{ ft/count}$$

The receiving station consists of a detection microphone, amplifier, radio receiver, filters, and a display counter. It is a single compact unit which can easily be held in the operator's hand.

These together with other objects and advantages which will become subsequently apparent reside in the details of the construction and operation as more fully hereinafter described and claimed, reference being had to the accompanying drawings forming a part hereof, wherein like numerals refer to like parts throughout.

BRIEF DESCRIPTION OF THE DRAWINGS

FIG. 7 is a detailed view of the reel shaft compressor seal and commutator structure;

FIG. 8 is a diagrammatic showing of the leak detector head unit per se.;

FIG. 9 is a diagrammatic side elevational view of a second embodiment of the supply reel having double (individual) hose and cable structure; and FIG. 10 is a modification of the T-tap structure of FIG. 2.

DESCRIPTION OF THE PREFERRED EMBODIMENT

Figure 1:
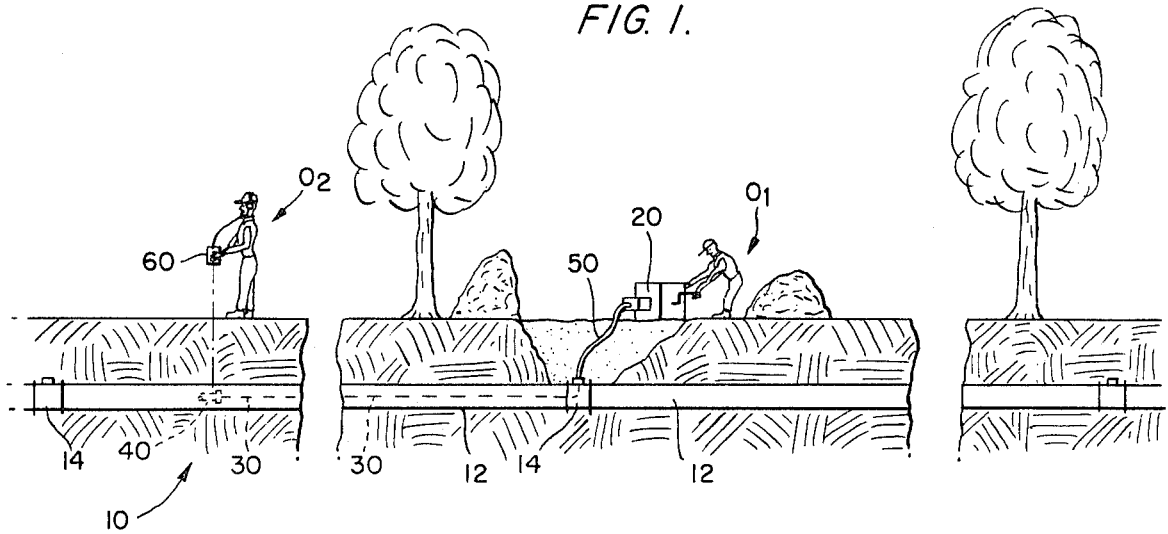
FIG. 1 is a perspective view of the leak detector of the present invention as in use for detecting a leak in a pressure main.

Referring to FIG. 1 of the drawings, reference numeral 10 indicates in general the leak detector of the present invention. The detector head unit 40 is shown as being controlled by a first operator $O_1$ while a second operator $O_2$ uses the signal receiver of the invention.

As shown in FIG. 1, normally a pressure main 12 is formed of eighteen or twenty-foot sections coupled together with coupling fittings, not shown. These couplings appear between the pipe sections every eighteen feet or so. Occasionally a pipe itself splits and leaks but usually leaks occur at the coupling per se, because of a poor gasket, poor seal, and the like. It is also quite common in pressure mains to have a plurality of leaks along a given block or so with the position of each leak being required so that extensive work and excessive digging can be eliminated.

In the present invention a T-tap fitting is preferably installed during the initial laying of a pipe which valve fitting will permit the use of this invention whenever necessary, but these can be added as needed to existing mains. Such fittings 14 are shown in FIG. 1. Preferably such fitting 14 will be placed at approximately 2,000 feet along each line. With a T-tap every 2,000 feet, 1,000 feet of hose and cable will be sufficient to cover the entire line from each direction. In normal use, a hydraulic pressure jet forces the head unit 40 to the end of the hose/cable 1,000 foot length in the main in which the pressure has been removed. Then when the head unit is at the end of its length (1,000 feet) the water main is once again pressurized with approximately 100 pounds per square inch pressure of water, then the operator $O_1$ at the take-up reel station 20 slowly winds up the hose/cable to bring the head unit back to the insertion T-tap 14 adjacent to station 20. Of course, as soon as a retraction procedure begins, the microphone in the head unit is turned on so that the operator $O_1$ at the take-up station 20 can hear the substantially increased noise wherever a leak exists. As soon as the first leak is discovered, the operator stops winding the reel, thus allowing the head unit to remain in position adjacent to the leak and then the transducer in the head unit is energized by a transmitter at the hose reel station to send the desired signal through the earth for reception by the second operator $O_2$ having a receiver station 60. As the second operator walks over the ground above the pipe or main a signal is detected and at the signal point the operator suitably notes the position on the ground. Then the process can continue to find the second leak by operator $O_1$ retracting the head unit once again toward the takeup station 20 and the second operator $O_2$ walking back toward the takeup station to keep track of the head unit in the ground therebelow.

Figure 2:
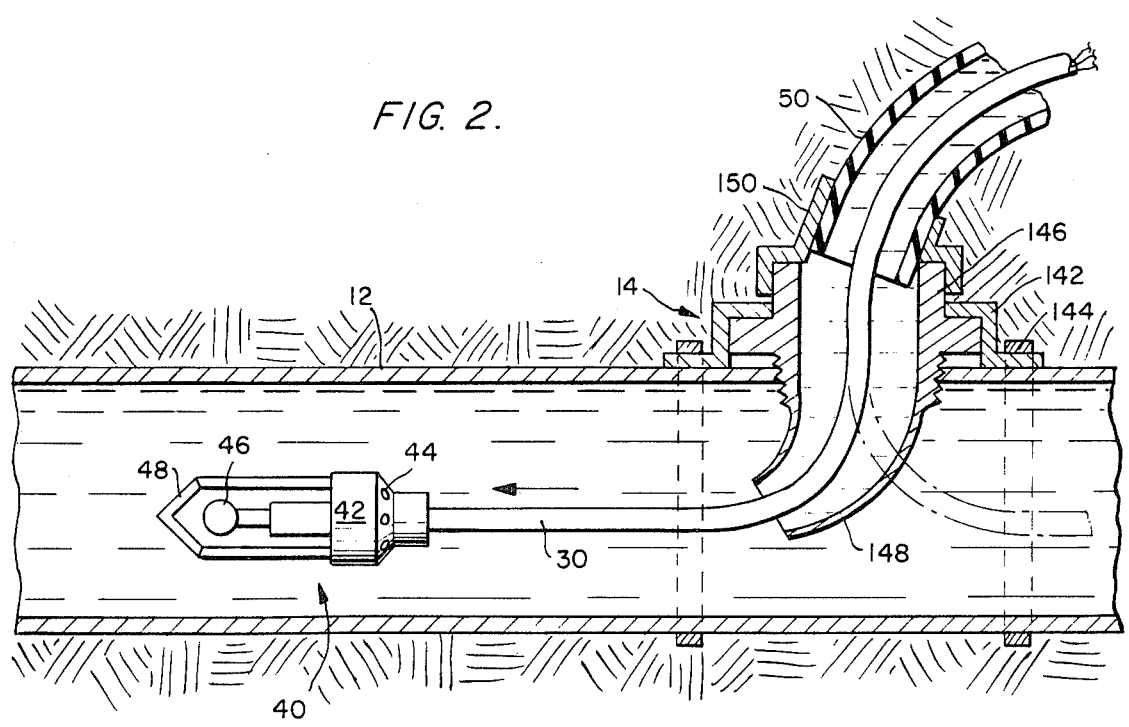
FIG. 2 is a side elevational view partly in cross-section of the detector head unit of the present invention.

The specific details of the present invention will now be described. FIG. 2 shows the hose/cable 30 which has been inserted through a T-tap 14 into the water main 12. The head unit 40 has a body portion 42 provided with a plurality of jet apertures 44 facing rearwardly therein, a microphone pickup 46, and a transducer 72. Suitable covering and protective elements 48 are also provided.

The T-tap structure 14 consists of an angular portion 142 which may be appropriately split which is securely clamped to the main pipe 12 by clamping bands 144 or tapped directly in the pipe. At one point inside the circumference of the angular portions 142 is provided a rotatable insert coupling 146. This insert 146 in turn has secured thereto an appropriate female connector 150 for reception of the short coupling hose 50 from the reel takeup station 20. A somewhat conical and tapered end outlet 148 is suitably secured to the inner outlet of rotatable coupling 146. As can be visualized by looking at FIG. 2, this rotatable coupling 146 permits the hose/cable to enter the pipeline in one direction or the other.

Figure 4:
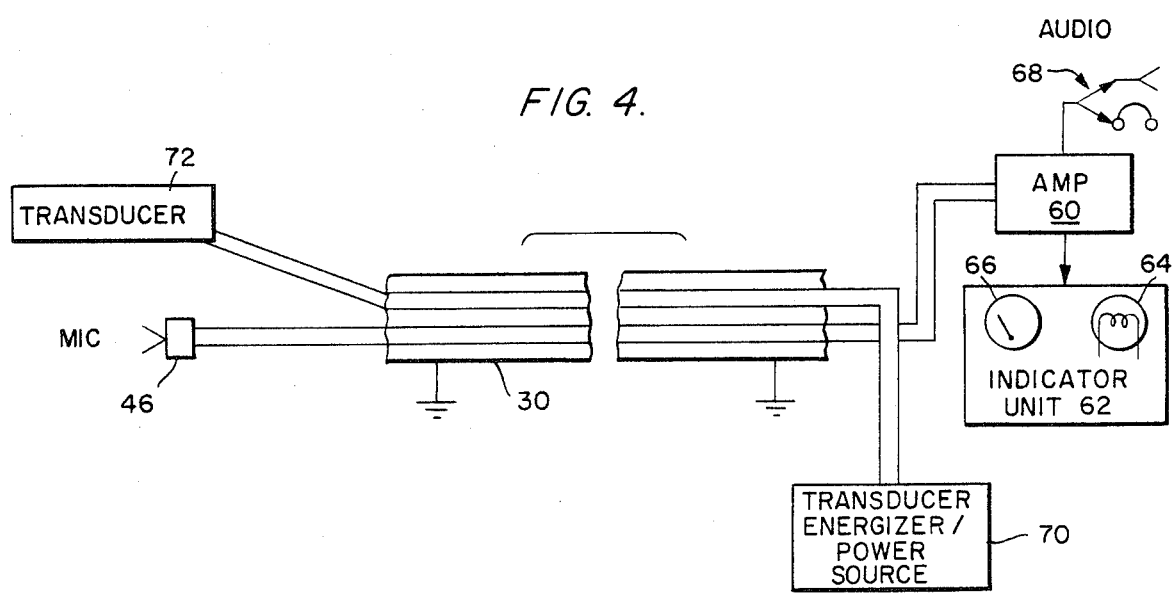
FIG. 4 is a diagrammatic schematic of the electrical/electronic components of the present invention.

The schematic diagram of FIG. 4 shows the electronic elements of the present invention. A microphone 46 which is physically mounted in the head unit 40 is connected by two electrical wires to an amplifier 60. The amplifier 60 suitably increases any signal picked up by the microphone for audio reception by operator $O_1$ indicating unit 68 or visual attention actuation by indicating unit 62. Indicating unit 62 preferably has at least an alarm light 64 plus a meter for accuracy 66. Of course, when the operator is suitably alerted by the alarm signal at 68, he then can fine tune the unit by visual observation of indicator unit 62. Operator $O_1$ then, when a suitable leak is detected, can energize transmitter 70 with a self-contained power source and oscillator for effecting actuation of the transducer 72 within the head unit 40. Suitable electrical wires connect the transmitter and transducer unit. The hose/cable 30 normally contains four electrical wires plus the ground of the cable itself as indicated. This hose/cable also suitably will contain pressurized liquid, preferably water, for forcing pressurized liquid through the hose/cable to the jets 44 of the head unit. In future units this may be a double barrel hose, one for carrying the pressurized liquid and the other as a protective casing for the wire cable.

Figure 3:
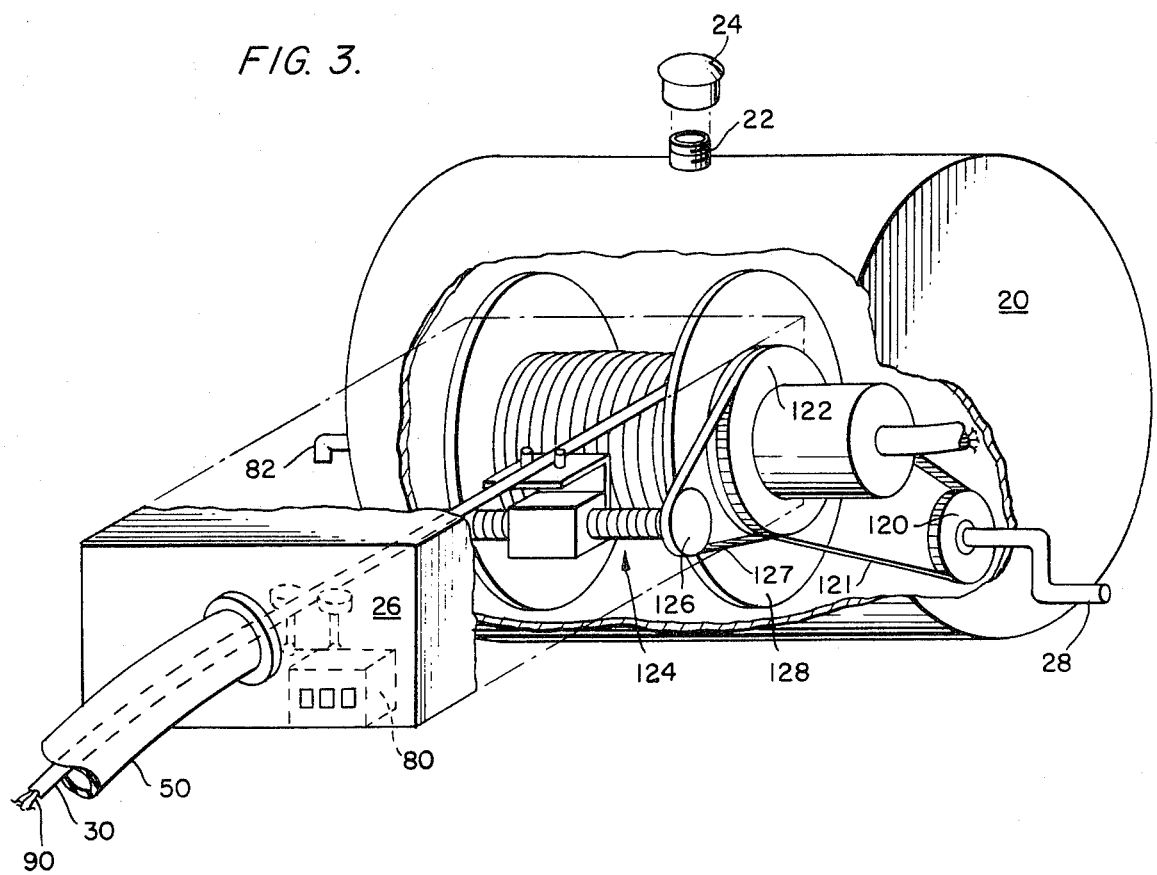
FIG. 3 is a perspective view of the hose and cable supply reel structure for the present invention.

FIG. 3 shows the takeup reel and supply station 20. A suitable opening 22 with a cap plug 24 is provided to permit chlorine to be added to the station 20 after suitably filled with water. A hand crank 28 can be operated by operator $O_1$ which in turn operates gear 120 which by belt or chain drive 121 turns the reel gear 122. Another gear belt 127 is suitably rotated by belt gear 122 to energize pinion gear 126 for operation of a suitable hose/cable traverse mechanism 124 in conventional manner. A takeup reel 128 suitably contains at least 1,000 feet of hose/cable thereon when full. Of course, the hand crank 28 for operating the system manually can be suitably replaced by motor driven structure, but for simplicity's sake, and ease of operation, the manually operated hose reel is quite adequate. A suitable footage indicator 80 is also shown in FIG. 3 to give the operator $O_1$ some reference point when letting the hose/cable out or retracting same.

Figure 5:
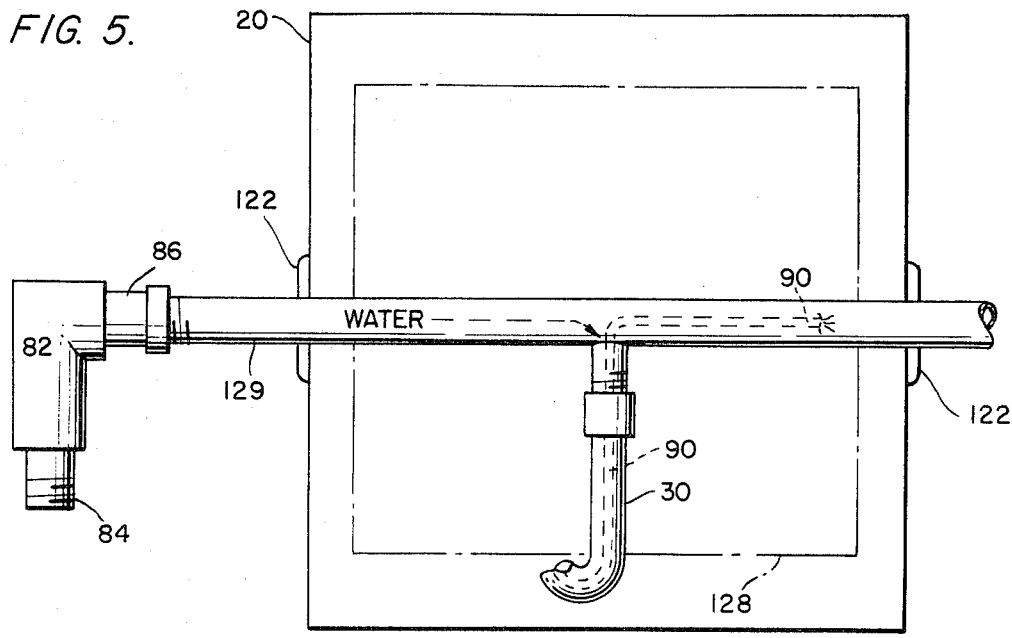
FIG. 5 is a schematic side elevational view of the hose and cable supply reel structure.

FIG. 5 shows a diagrammatic view of the hose reel takeup station 20 in cross-section. Inside the hose drum 128 is a support shaft 129 which provides for the conduction of water pressure into the hose/cable 30 structure to pressurize the detector head 40. Suitable seals 122 are provided at each end of the outer housing 20 for the hose drum. On the left of FIG. 5, the shaft 129 is suitably coupled to a 90 degree swivel union 82 by a stub portion 86. Stub portion 84 of this swivel union is connected to suitable water line in order to feed pressurized water to the hose/cable 30. The electrical cable of preferably at least four electrical conductors 90 is shown in FIG. 5 with one end going to the detector head unit 46 at the free end of the hose/cable and then the inner end going to a suitable commentator and connector arrangement is shown in greater detail in FIGS. 6A and 6B.

Figure 6A:
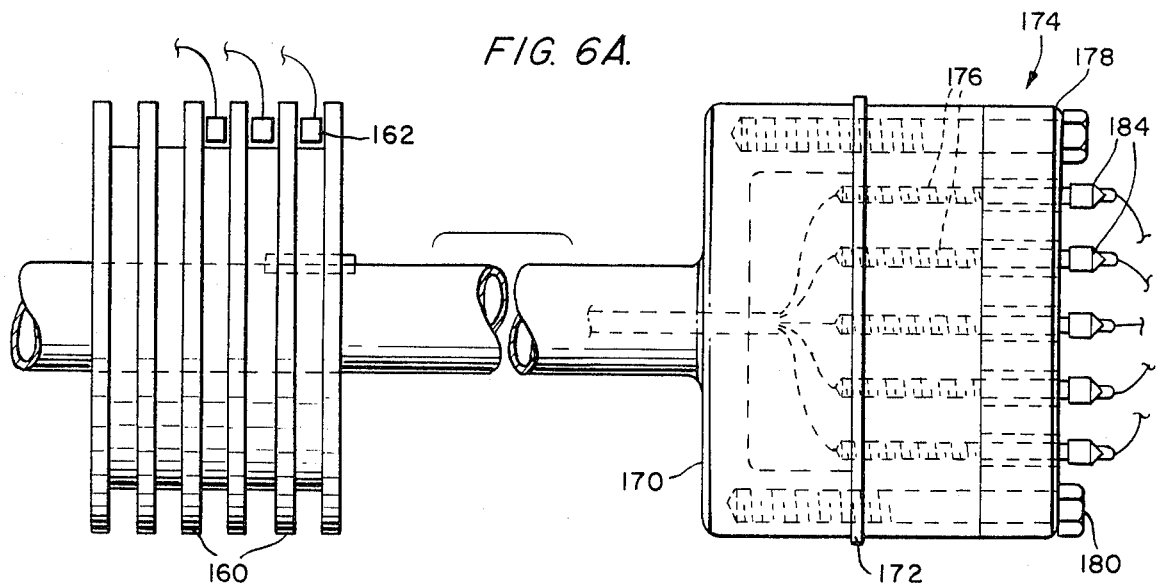
FIGS. 6A and 6B are diagrammatic showings of the electrical commutator connections for the cable.
Figure 6B:
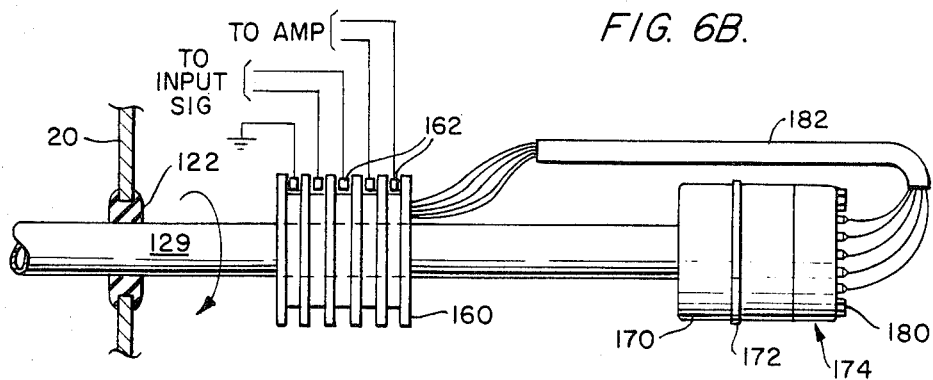

Looking at FIG. 6A the commutator structure for the electrical cable, one embodiment, is shown. FIG. 6B shows another embodiment of this commutator and cable connection structure. As shown in FIG. 6B, the reel shaft 129 with housing seal 122 is extended so as to support commutator rings 160 thereon. A plurality of brushes 162 engage the respective commutators to provide electrical connections to the amplifier to the microphone input signal, and to ground as indicated. A short connecting cable 182 connects the commutator rings to the connecting structure to the end of cable 90 from within shaft 129. A compression flange 170 is provided with a full-faced flange gasket 172, a nonconductive spacer 174 having threaded pins 176 therethrough, a metal washer 178, supporting bolts 180 and take apart connectors to short cable 182 (174 as shown in FIGS. 6A, 6B). By this commutator connector structure, suitable electrical transmissions connections can be made between the electrical components shown in FIG. 4 outside of the cable reel housing and the detector head unit 40.

FIG. 8 shows in greater detail the structure of the detector head unit 40. The head unit has a main head member 42 provided with a plurality of backwardly and outwardly driving jet apertures 44 therein. Preferably the head unit 42 is made of aluminum and therefore to prevent undue wear of apertures 44 preferably steel sleeves are inserted in the respective apertures. These jet apertures or ports are as mentioned above used for forcing the detector head forward by means of the jet action of water jetting backwardly therefrom. The input hose/cable 30 for feeding the water pressure to the head unit is shown at the left and the cable for electrical connection 90 is also shown. Suitable gasket 272, an angular nonconducting unit 274, suitable head bolts 280, are also shown in FIG. 8. The electrical connections to the microphone 46 and the transmitter transducer 72 are also indicated. Suitable epoxy 82 may be applied wherever it is desired to positively ensure that there will be no leakage and to protect the wire pins.

FIG. 9 shows a second embodiment of the invention. Each element which is similar to that in FIG. 5 has a corresponding reference number with a prime thereafter. Support shaft 129' has double outlets 529 so that a double barrel hose 530 consisting of separate, individual hoses 30', 430 can be used. Hose 430 contains electric wire cable 90', and thus in this embodiment the wire cable needs protection only from the pressure in the main, and not additionally from the head jet water pressure. Also, by using separate hoses, no reduction of pressure in the jet hose 30' is experienced because of the decrease in interior area created by the wire cable 90 therein.

FIG. 10 shows a modification of the T-tap of FIG. 2. Similar elements have the same reference numbers with a prime. The modifications include a threaded tap, sealing gaskets 320, and sealing O-rings 322. The coupling hose 50' receives the cable/hose 630 of either the single or double hose embodiments. The sealing gasket 320 and the O-rings 322 prevent water leakage when the rotatable coupling 146' swivels inside the T-tap structure in conventional manner, and need not be described in detail.

Of course, when the detector of this invention is not being used, conventional type closer structures are used at the spaced T-tap areas to prevent leakage from the mains.

The present invention when used by city water departments and other municipality service organizations, offers a new and convenient way of detecting leaks in fresh water mains, salt water fire mains, and the like. Wherever there is a possibility of earth disruptions such as earthquakes, earth tremors, excavation vibrations, deterioration of couplings, etc. can effect cracking or disturbance of coupling seals and thereby cause leaks to occur in existing lines and also in new lines, leaks can be caused by the initial construction. Therefore, if during initial installation of the lines themselves, the T-taps 14 were appropriately installed, it would then be very easy later on, even years later, to use the leak detector of the present invention and the method thereof for finding one or a plurality of leaks in the pressurized mains.

The foregoing is considered as illustrative only of the principles of the invention. Further, since numerous modifications and changes will readily occur to those skilled in the art, it is not desired to limit the invention to the exact construction and operation shown and described, and accordingly; all suitable modifications and equivalents may be resorted to, falling within the scope of the invention.

What is claimed is:

1. A leak detector device for use in detecting leaks in pressurized water mains comprising:

detector means which can travel an extended distance inside said water mains when same have been depressurized;

insertion coupling means attachable to said mains at spaced points therealong to permit entry of said detector means into the mains after depressurization thereof;

further means for effecting movement of the detecting means lengthwise of the depressurized mains in one or the other of each direction thereof; and additional means for effecting both reverse movement of the detector means and for making electrical connections therewith.

2. A leak detector device as set forth in claim 1, wherein said detector means includes a heat unit, and said further means includes said head unit being provided with hydraulic jet structures for effecting movement of said detecting means in one direction along a depressurized water main.

3. A leak detector device as set forth in claim 2, wherein said detector head unit further includes electrical means for detecting a noise caused by a leak area upon repressurization of the main, and further means for effecting transmission of a signal to a receiver above the ground over the buried water main.

4. A leak detector device as set forth in claim 2, wherein said insertion coupling means for the water main includes a plurality of T-tap couplings appropriately spaced along the water main to permit insertion of the detector means as appropriate when a leak in the main is suspected.

5. A leak detector device as set forth in claim 4, wherein said T-tap coupling includes a swivel mount to permit the detector means being inserted into the water main in either of two directions lengthwise thereof.

6. A leak detector device as set forth in claim 1, wherein said further means for effecting movement of said detector means lengthwise of the depressurized water main includes hydraulic jet structures associated with said detector means for effecting travel thereof under hydraulic pressure.

7. A leak detector device as set forth in claim 6, wherein said additional means includes a hose/cable attachment to the detector means for providing hydraulic pressure to said jet structures, and retracting force along with electrical energy to the detector means for effecting the movement and energization thereof.

8. A method for detecting leaks in a water main comprising:

installing a plurality of input coupling structures at suitable spacings along the water main;

inserting a detector head connected to a length of hose into the main through one of the coupling structures when the main has been depressurized;

effecting movement of the detector head structure lengthwise in the main approximately the length of the hose coupled thereto by use of the force of hydraulic jet action;

after the detector head has been extended lengthwise of the main pressurizing same to effect any leaking action; slowly withdrawing or retracting the detector head toward the insertion couping and simultaneously listening through electrical pickup means for the sound of noise caused by leakage; when such leakage noise is detected, stopping the retraction movement of the detector head; after the detector head has been stopped at a leakage point then energizing an oscillator at the hose/reel control station which through a transducer produces an audio frequency that is received through the earth above the water main; using a receiver above the earth to pick up the signals and thereby pinpoint the area of leakage so that a repair group can dig at that point to uncover the main and repair the leak area.

9. A method as set forth in claim 8, including the further steps of retracting the detector head again toward the insertion point after the first leak has been detected and repeating the listening and transmission steps again for further leaks with the receiver being used to pinpoint each and every one of the further leak areas.

10. A method as set forth in claim 8, wherein the installation of a plurality of input coupling structures is effected during the initial installation of the water main.

11. A method of detecting leaks as in claim 8, wherein a plurality of input coupling structures are installed as appropriate after initial installation of the water main.

12. A leak detector for detecting leaks in mains which normally are under fluid pressure comprising:

detector means which can travel an extended distance inside such a main after it has been depressurized;

coupling means attachable to the main to permit entry of said detector means thereinto;

propulsion means for effecting movement of the detecting means lengthwise of the main in a first direction while the main is still depressurized; and combination retraction/energization means for effecting reverse movement as well as electrical operation of said detector means after the main is repressurized.

13. A leak detector as set forth in claim 12, wherein said combination retraction/energization means includes a hose/cable attached to the detector means for providing retacting force to the detector means for effecting the reverse movement thereof and simultaneously electrical energization thereto.

14. A leak detector as set forth in claim 13, together with a reel means upon which said hose/cable is wound.

15. A leak detector as set forth in claim 14, wherein said reel means is contained within a housing which can be pressurized.

16. A leak detector as set forth in claim 15, wherein said housing for the reel means is provided with seal means to prevent leakage therefrom when under pressure.

17. A leak detector as set forth in claim 16, wherein said detector means further includes electrical means for detecting a noise caused by a leak and further means for effecting transmission of a signal to a receiver above the ground over the buried main.

18. A leak detector as set forth in claim 12, wherein said detector means further includes electrical means for detecting a noise caused by a leak and further means for effecting transmission of a signal to a receiver above the ground over the buried main.

19. A leak detector as set forth in claim 12, wherein said coupling means for the main includes a plurality of T-tap couplings appropriately spaced along the main to permit insertion of the detector means as appropriate when a leak in the main is suspected, said T-tap coupling including a swivel mount to permit the detector means being inserted into the main in either of two directions lengthwise thereof, and seal means to prevent leakage through the coupling once the main has been repressurized.

20. A leak detector as set forth in claim 12, wherein said propulsion means for effecting movement of said detector means lengthwise of the main includes a hydraulic jet with said detector means for effecting travel thereof under hydraulic pressure.

* * * * *